United States Patent [19]

Quick

[11] Patent Number: 5,006,193

[45] **Date of Patent: *Apr. 9, 1991**

[54] AUTOMATIC CLAMP TIGHTENER

[75] Inventor: Bradley S. Quick, Staatsburg, N.Y.

[73] Assignee: James L. Taylor Manufacturing Co., Poughkeepsie, N.Y.

[*] Notice: The portion of the term of this patent subsequent to Oct. 10, 2005, has been disclaimed.

[21] Appl. No.: 353,699

[22] Filed: Jul. 19, 1989

Related U.S. Application Data

[63] Continuation-in-part of Ser. No. 244,915, Sep. 14, 1988, Pat. No. 4,952,269, which is a continuation of Ser. No. 846,363, Mar. 31, 1986, Pat. No. 4,778,555.

[51] Int. Cl.[5] .......... B23Q 3/08

[52] U.S. Cl. .......... 156/350; 144/245 B; 269/25

[58] Field of Search .......... 156/350, 558; 269/910, 269/20, 155, 58, 25, 27, 26, 31; 92/96; 100/232; 144/245 B, 242 B

[56] References Cited

U.S. PATENT DOCUMENTS

| | | | |
|---|---|---|---|
| 1,219,429 | 3/1917 | Billstrom | 144/245 BX |
| 1,320,808 | 11/1919 | Taylor | 269/57 |
| 1,321,572 | 11/1919 | Taylor | 144/245 BX |
| 1,529,281 | 3/1925 | Taylor | 269/120 |
| 1,782,846 | 11/1930 | Gardner | 144/245 BX |
| 1,799,135 | 3/1931 | Roberts | 144/245 BX |
| 1,873,818 | 8/1932 | Burns | 144/245 BX |
| 1,896,113 | 2/1933 | Steuernagel | 144/245 BX |
| 1,981,499 | 11/1934 | Francis | 144/245 BX |
| 2,321,644 | 6/1943 | Billstrom et al. | 144/245 BX |
| 2,619,999 | 12/1952 | Lehmann | 144/245 B |
| 3,488,046 | 1/1970 | Quick et al. | 269/20 |
| 3,771,779 | 11/1973 | Mortoly | 269/25 X |
| 4,778,555 | 10/1988 | Mortoly et al. | 269/25 X |

*Primary Examiner*—Michael W. Ball
*Assistant Examiner*—Jeff H. Aftergut
*Attorney, Agent, or Firm*—Weingram & Zall

[57] ABSTRACT

An automatic clamp tightener utilizes an air driven rotating tightener which is suspended on a plate. The plate is caused to slidably move inwardly towards the clamp to be tightened and to be withdrawn therefrom. A laterally movable carriage supports the tightener and the suspension plate. The tightener employs mechanic stops for end-left and end-right of the carriage to limit motion of the carriage. The motor driving the carriage bearing the suspended tightener may be either a stepping motor or a servo motor. The air driven tightener is powered to open or tighten a clamp for either a predetermined period of time or until a predetermined tension or strain is sensed in the clamp.

4 Claims, 8 Drawing Sheets

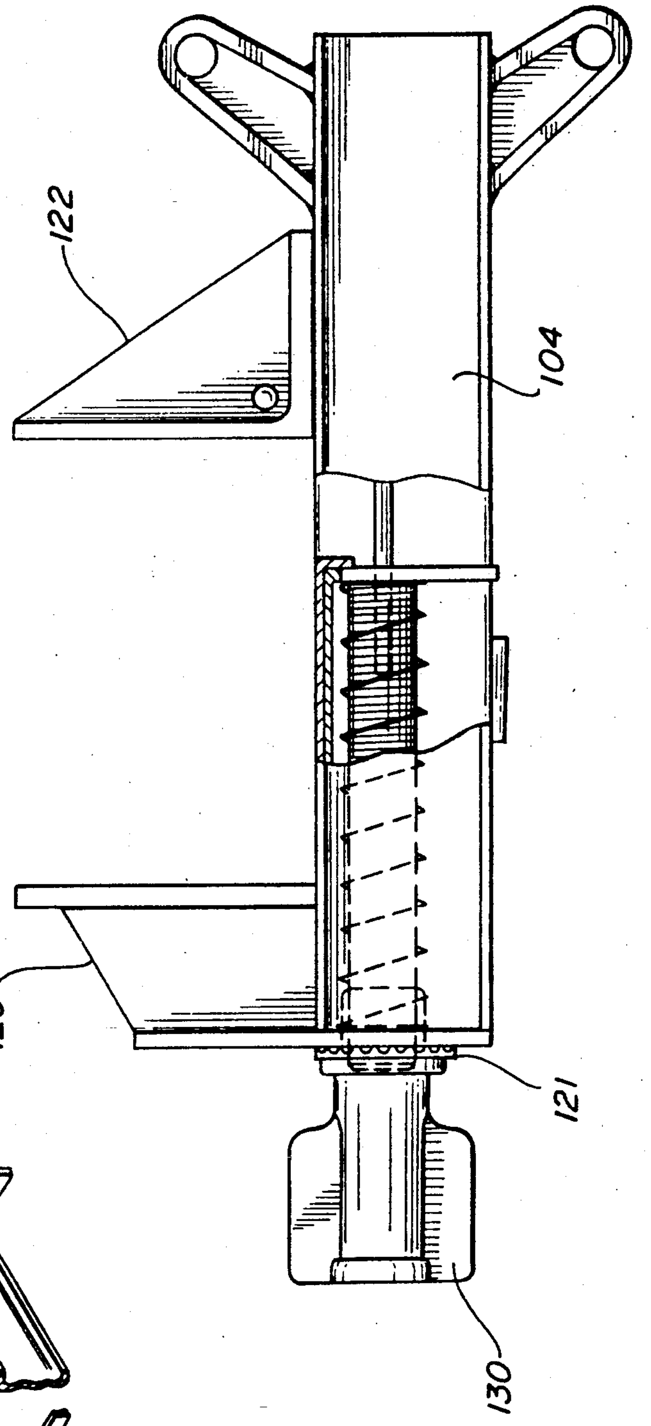
FIG-7
FIG-4a
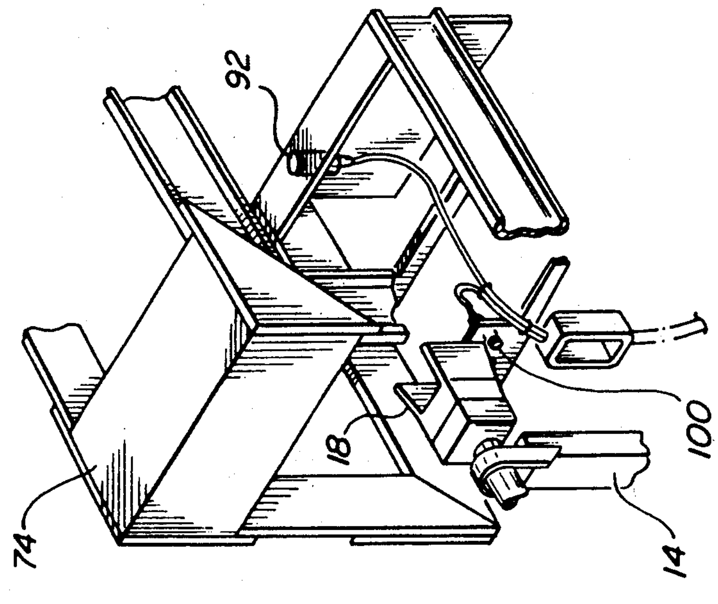

AUTOMATIC CLAMP TIGHTENER

CROSS-REFERENCE TO RELATED APPLICATIONS

This application is a continuation-in-part of application Ser. No. 07/244,915 filed Sept. 14, 1988, now U.S. Pat. No. 4,952,269 which is a continuation of application Ser. No. 06/846,363, filed Mar. 31, 1986, now U.S. Pat. No. 4,778,555, issued Oct. 18, 1988.

BACKGROUND OF THE INVENTION

1. Field of the Invention

This invention relates to a device for automatically tightening and loosening clamps. The specific application of the invention is for clamps in a wood gluing machine; however, the structure and concepts of my invention are usable in any apparatus where clamps are to be tightened or loosened. In fact, the invention is not limited to the tightening or loosening of clamps, but may be used to automatically open and close any threaded nut.

2. Description of the Prior Art

U.S. Pat. No. 3,771,779, commonly assigned, discloses a wood gluing machine where a powered tightener for clamps is manually moveable into and out of engagement with a clamp.

U.S. Pat. No. 4,489,925, also commonly assigned, discloses a device for clamping a number of wood work pieces. That device has a number of clamp carriers or clamp frames. A plurality of clamps are mounted on each clamp frame or carrier. In operation, the wood pieces to be glued are placed within the jaws of the clamps on each clamp carrier and then a new clamp carrier is brought into operation by removing the wood with the glue having dried, and reinserting new glued pieces of wood therein.

The wood gluing art has long recognized the need to automate what, for many years, has been essentially a manual operation. The field involves the cutting and sizing of strips of wood which are then glued along their edges, clamped together, the glue being allowed to set, and the wooden panel thus formed removed for further processing. Examples of various machinery developed to automate the steps in this basic operation are shown in U. S. Pat. No. 4,374,165 and U.S. Pat. No. 4,062,320 commonly assigned, where equipment to automate the edge gluing of the strips of wood is disclosed.

The present invention represents an extension of the industry trend to automate various of the steps in the process and involves an apparatus which automatically tightens and loosens the clamp on the machine of the type shown in the aforementioned U.S. Pat. Nos. 4,489,925 and 3,771,779.

SUMMARY OF THE INVENTION

The invention disclosed and claimed in U.S. Pat. No. 4,778,555 utilizes an electronic sensor and programmable controller. The sensors detect the location of a clamp or other screw to be rotated. The unit is automatically shifted to that point and the rotating chuck is brought into engagement with the clamp. The chuck is driven until it reaches a stall condition at which time such condition is sensed, and the unit withdrawn and indexed to the location of the next clamp to be rotated. In the wood gluing apparatus where the invention has been utilized, the clamps are for the wood gluing machine of the type shown in U.S. Pat. Nos. 3,771,779 and 4,489,925. As shown therein, a series of clamps are employed to hold several work pieces (each of which consist of several pieces of wood to be glued together into a single unit). Specifically, the glued pieces are placed or stacked edge to edge for the desired width. A number of such pieces, 4–6 or 2–12 depending on size, are placed on a table-like configuration. Each of the sets may be loosely clamped into place by hand tightening. The automatic clamp tightener of the present invention serves to tighten the clamps sequentially firmly against the work piece.

On completion of the tightening, the entire array of tightened clamps are automatically indexed, as by rotation, with their associated work pieces, so that a new table-like surface is presented to the operator for processing. When the wood is sufficiently cured, it is ready for removal. The invention automatically loosens the clamps allowing the cured wood to be removed.

Again, the invention of U.S. Pat. No. 4,778,555 is not limited to clamps or to wood gluing. In brief, that invention employs an air driven rotating chuck or lug wrench of the type such as a Taylor 8000 or Ingersoll Rand 3840P. These devices, commercially available, are mounted for pivoting into and out of engagement with the clamp to be rotated. The entire pivotable unit rides on a frame which carries it laterally from stations to station. The rotating chuck pivots away or out of engagement with a clamp and the frame is indexed so that the entire unit pivots into engagement with the clamp and drives to stall to tighten, or, in the opposite direction, loosen the clamp.

The indexing and tightening mechanism of that invention, when used in gluing and clamp tightening for wood, employs and added step and structure which serves to first automatically flatten the various pieces of the wood panel, then tighten the clamp. This flattening structure includes two elongated arms which are dropped down onto the top surfaces of the stack of wooden pieces to flatten same and hold them in place. The clamp chuck then pivots and engages the clamps to sequentially tighten same. Thus, the work piece is held securely in place during the tightening and loosening of the clamp.

It is an object of the present invention to automatically tighten and loosen the clamps in a wood gluing machine.

Another object of the present invention is to speed up the throughput and/or productivity of a wood gluing process by providing automatic clamp opening and closing.

Another object of the present invention is the provision of an automatic clamp tightener for any type of clamp.

Another object of the present invention is the provision of an automatically indexed system for a stall operation lug wrench which locates the wrench at the desired locations.

Another object of the present invention is to provide a means for securely holding in place the work piece during the tightening of the clamp.

Another object of the present invention is to provide an automatic mechanism for supporting the work piece during adjustment of the clamp.

Another object of the present invention is the provision of a combined flattener for the work piece and the clamp tightener so that the work piece is automatically first flattened, then the clamps are tightened while the flattener maintains pressure on the top surface of the work piece.

BRIEF DESCRIPTION OF THE DRAWINGS

These and further objects and advantages of the present invention will become apparent to those skilled in the art from review of the following specification and accompanying drawings in which:

FIG. 4A is a perspective view of a modification of the device shown in FIG. 4;

FIG. 7 is a side view, partially in section, of a clamp assembly for use in a modified form of the invention;

DETAILED DESCRIPTION OF THE INVENTION

The present invention includes two subassemblies, a flattener subassembly and an air-driven tightener subassembly, both mounted on a frame. The frame is, in turn, mounted on a rail structure formed along the front or working position of the machine described in the U.S. Pat. No. 4,489,925. A motor is provided at one end of the rail which is coupled to the frame. The motor is capable of moving the frame along the rail and locating same at the desired position relative to the clamp and the work piece. The details of the frame and rail structure are described below in connection with FIGS. 5 and 6 below.

Figure 1:
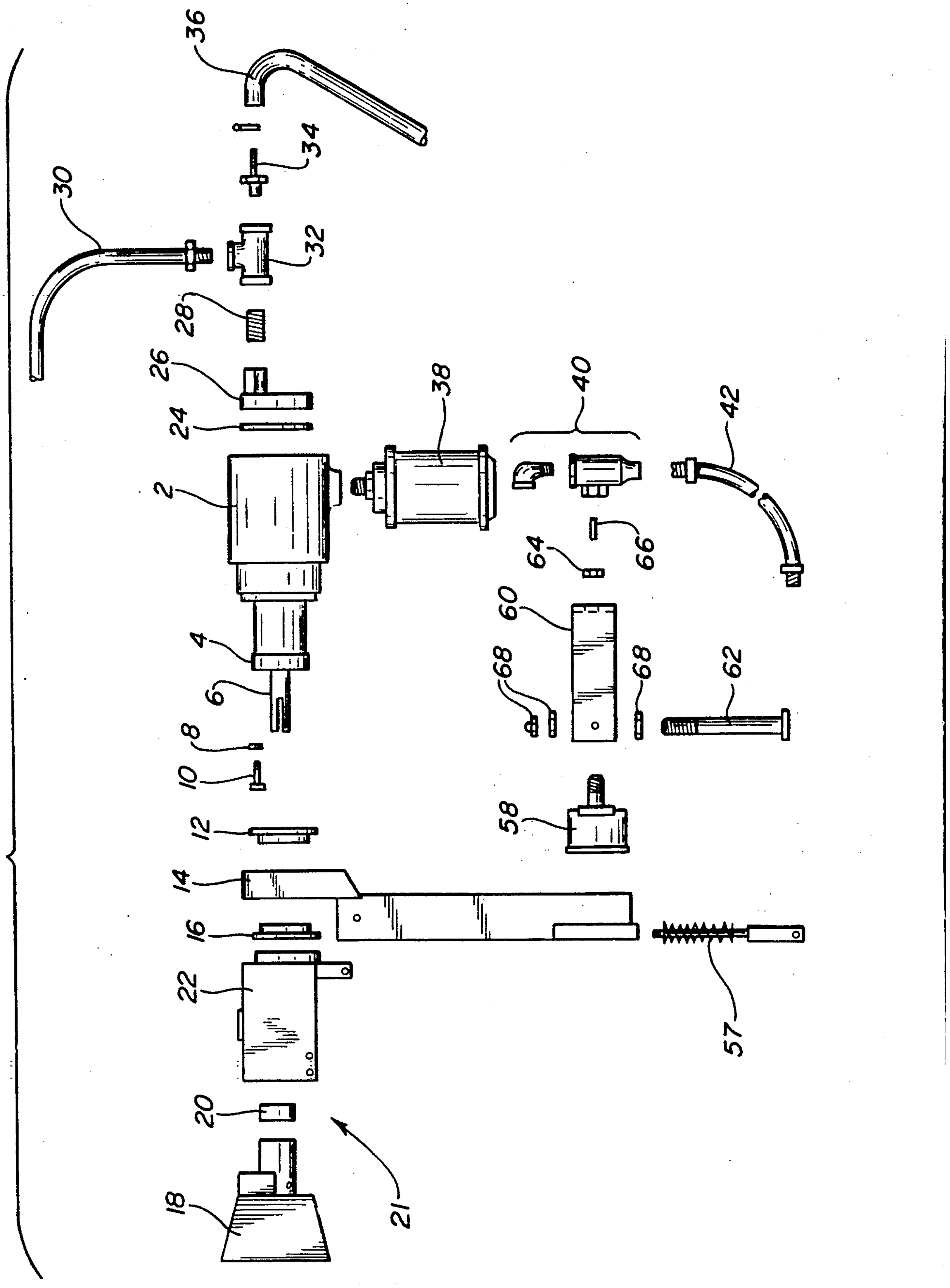
FIG. 1 is an exploded view of the air-driven rotating chuck and supporting structure of the present invention.

FIG. 1 is an exploded view of the clamp tightener and its mounting structure for one embodiment of the present invention. Note that FIG. 1 does not show the frame of the flattener and hold down mechanism for the work piece discussed above. FIG. 1 shows the pivoting tightener mounted for engagement with the clamps. More particularly, the tightener is shown at 2 having a rotating shaft 6 connected to a gear case shown generally at 4. A muffler 38 is coupled to the tightener 2 in standard fashion. The tightener is air driven and is connected to air line 36 via a tee 32. The usual gasket 24, back cap 26, and screw threaded elements 28 and 34 are employed with tee 32 to couple the air lines to the tightener 2. Hose 30 powers the flatteners.

A clamp engaging mechanism to engage, tighten and loosen the clamps is shown as comprising elements 8, 10, 12, 14, 16, 18, 20 and 22. More specifically, the yoke 22 engages the front jaw of the clamp to absorb torque. A rotating driver 18 for engaging the winged nuts on each clamp is mounted for engagement on bearing 20. A bracket 14 and support 12 and 16 are provided to support the shield structure in bracket 14. Bracket 14 is, in part, supported by spring 57. The entire unit is mounted on bracket 14.

The tightener is pivoted into and out of engagement via an air driven bladder shown at 58. More particularly, the bladder is coupled to the bracket 14 and on actuation, is filled with air to push the bracket and the tightener into engagement with the clamp. When the bladder is evacuated, gravity causes the tightener to tip backwards and fall out of engagement with the clamp to a predetermined position determined by stops on the bracket 14. The bladder 58 has supporting hardware 60, 62, 64, 66 and 68 to connect it to an air valve 40 and an air line 42.

Figure 3:
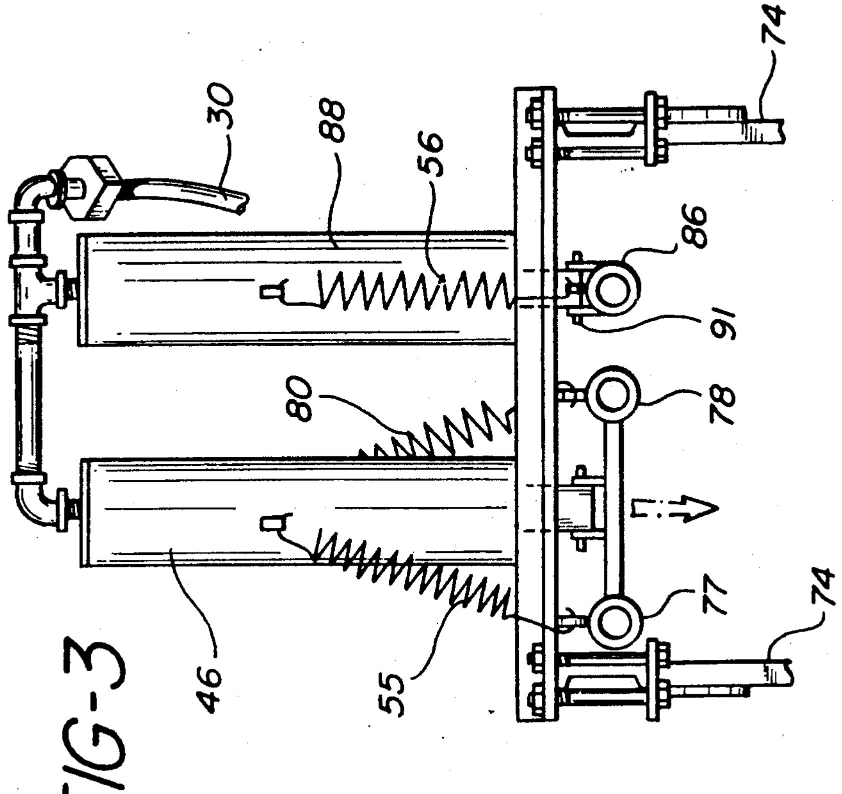
FIG. 3 is an end view of the flattener portion of FIG. 2.
Figure 2:
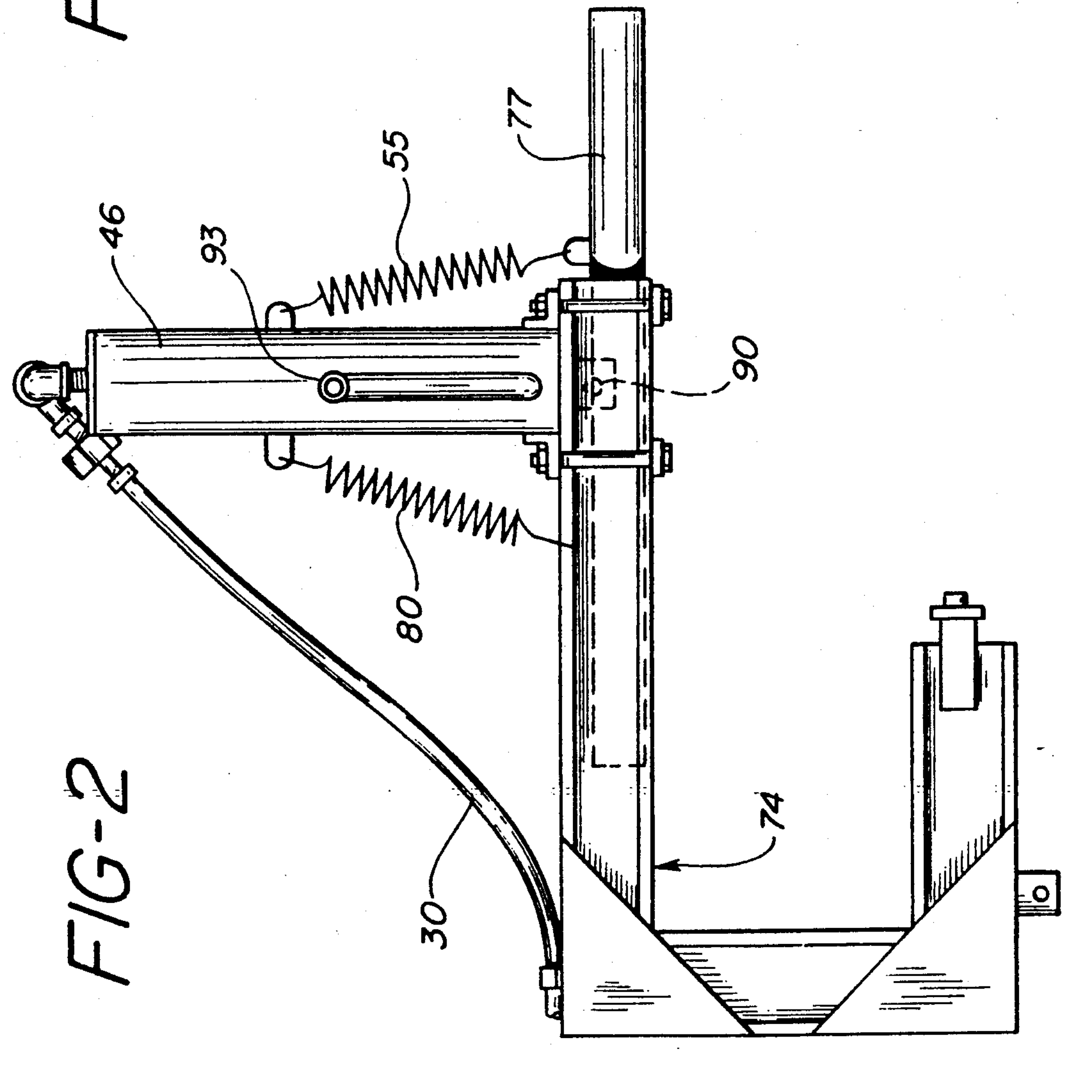
FIG. 2 is a side view of the flattener of the present invention on the slidable mounting frame.
Figure 5:
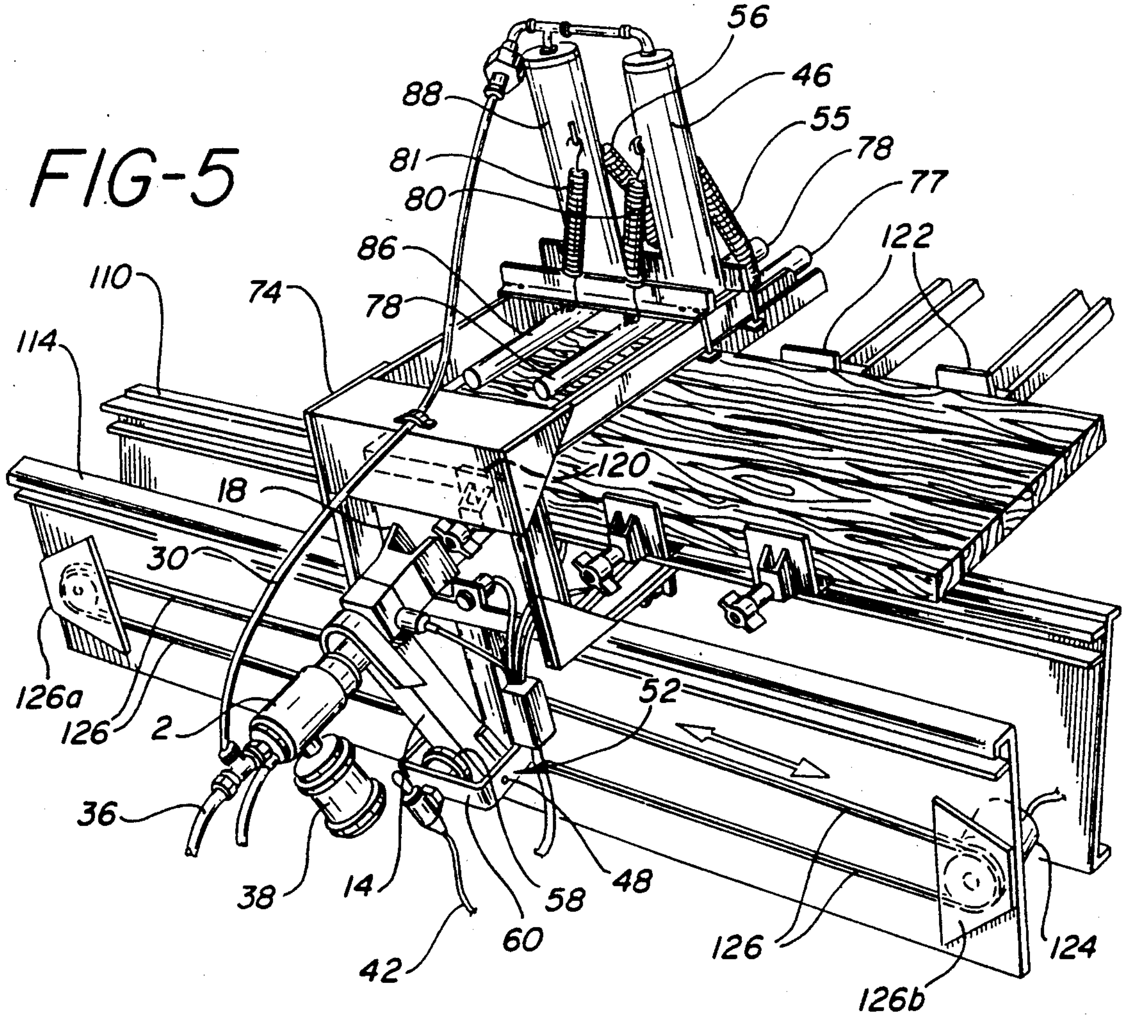
FIG. 5 is a perspective view of the subassemblies of FIGS. 1-3, mounted for operation.

FIG. 2 is a side view of the mounting and support for the work piece flattener mechanism. More particularly, two cylindrical bars 77 and 78 (shown in FIG. 3) are mounted on a pivot 90. Pivot 90 is connected to the piston of an air cylinder 46. On command, the air cylinder will fill, causing its piston to drop bars 77 and 78 into contact with the work piece to hold them down against the force of springs 55 and 80 during the tightening operation. FIG. 3 shows the mounting of the cylindrical bars 77 and 78 to the air cylinder 46. Another air cylinder, 88, is provided which drives a lead flattening shoe or cylindrical bar 86. This lead bar is actuated by air cylinder 88 and is connected by forward and rear springs 81 and 56 respectively. It has a pivot 91 in the same manner as hold down bars 77 and 78 are connected to the air cylinder by pivot 90. Both air cylinders 46 and 88 are actuated from the same air line 30 at the same time. Lead flattening cylinder 86 is located approximately a foot from the forward flattening shoe 78 of the pair 77, 78. The purpose of the lead flattening shoe is to hold down and align the wood in the next location to be flattened as well as to make sure that the wood is properly flattened by hold down bars or shoes 77 and 78. Note that forward and rear spring 80 and 55 are attached to different hold down bars as shown in FIG. 5 with the forward spring attached to hold down bar 78, while rear spring 55 is attached to hold down bar 77. This avoids an uneven pull being placed on the hold down bars by the action of these springs. The hold down bars are prevented from rotating by means of key 93 in the slot in the air cylinder 46. Springs 55 and 80 and 56 and 81 are provided to support the bars 77 and 78 and lead bar 86 and return them to their initial position when the air pressure is released. The entire hold-down assembly is mounted on bracket 74. As will be explained below, this bracket sequentially runs along a rail to carry with it the pivoting driver subassembly shown in FIG. 1 and the flattener hold down assembly discussed in connection with FIGS. 2 and 3.

Figure 4:
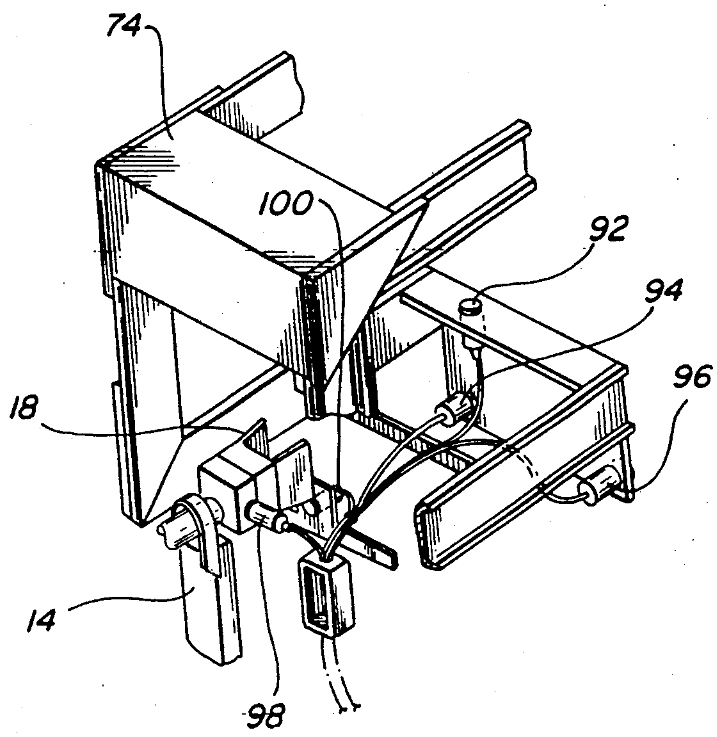
FIG. 4 is a perspective view of the sensors utilized to locate and otherwise control the flattener and the tightener of the present invention.

FIG. 4 shows the mounting of the various sensors needed to control the flattener hold-down device of FIGS. 2 and 3 and the pivoting fastener of FIG. 1. More particularly, in FIG. 4, various sensors are shown which, as will be subsequently described, feed a programmable control computer. The wood gluing embodiments of the invention utilizes five sensors. These sensors are proximity sensors manufactured by Industries Elektronik GmbH, Lanterhein, Federal Republic of Germany, under model number 1AS-60-A14-S. Sensor 92 detects the clamp location. Sensor 94 and sensor 96 detect the end of the unit at the left (for sensor 94) and the right (for sensor 96). Sensor 100 detects the tightener forward motion and the tightener will drive until stalled. A detection sensor 98 determines when the stall has occurred.

These five sensors serve as input to a programmable controller manufactured by Allen-Bradley, model number SLC-100. The program for the controller (programed into the device in accordance with the manufacturer's instructions) is set forth in U.S. Pat. No. 4,778,555, which is incorporated by reference thereto. As can be seen, the functions are actions based on the sensing of one or more of the events which are indicated by one of the five sensors described in connection with FIG. 4 above.

FIG. 5 shows the bracket 74 mounting both the flattener subassembly and the tightener subassembly. The tightener subassembly as shown in FIG. 5 is pivoting on the base 52 of bracket 74 at pivot 48. As shown, the diaphragm or bladder 58 is mounted between arm 14 as fixed base 60. Base 60 is to provide a fixed reference point for inflatable bladder 58. As can now be seen, bladder 58 is inflated and forces arm 14 away from fixed point 60, thereby bringing the tightener shown at 22 into engagement with the clamp or, in general, the nut to be rotated.

Flattener arms 77 and 78 and lead flattener arm 86 are shown mounted laterally across the open top of frame 74. As can now be seen, the arms are forced down into engagement with the work surface as the clamp is being tightened. As shown in FIG. 5, cylindrical bars 77 and 78 are supported by springs 55 and 80. The second air cylinder, 46, is shown having its air line coupled directly to air cylinder 88 to drive lead flattener arm 86 supported by springs 81 and 56.

As will now be seen, the frame 74 can be slidably mounted or otherwise adjusted laterally to position itself relative to the clamp to be tightened.

This is accomplished by a motor 124 and connecting chains 126. The chains are connected to the support frame 74 to draw the support frame 74 along rail 114 from one side of the machine to the other, and then return to loosen clamps as desired. Numeral 120 in this figure denotes a clamp to be tightened.

Figure 6:
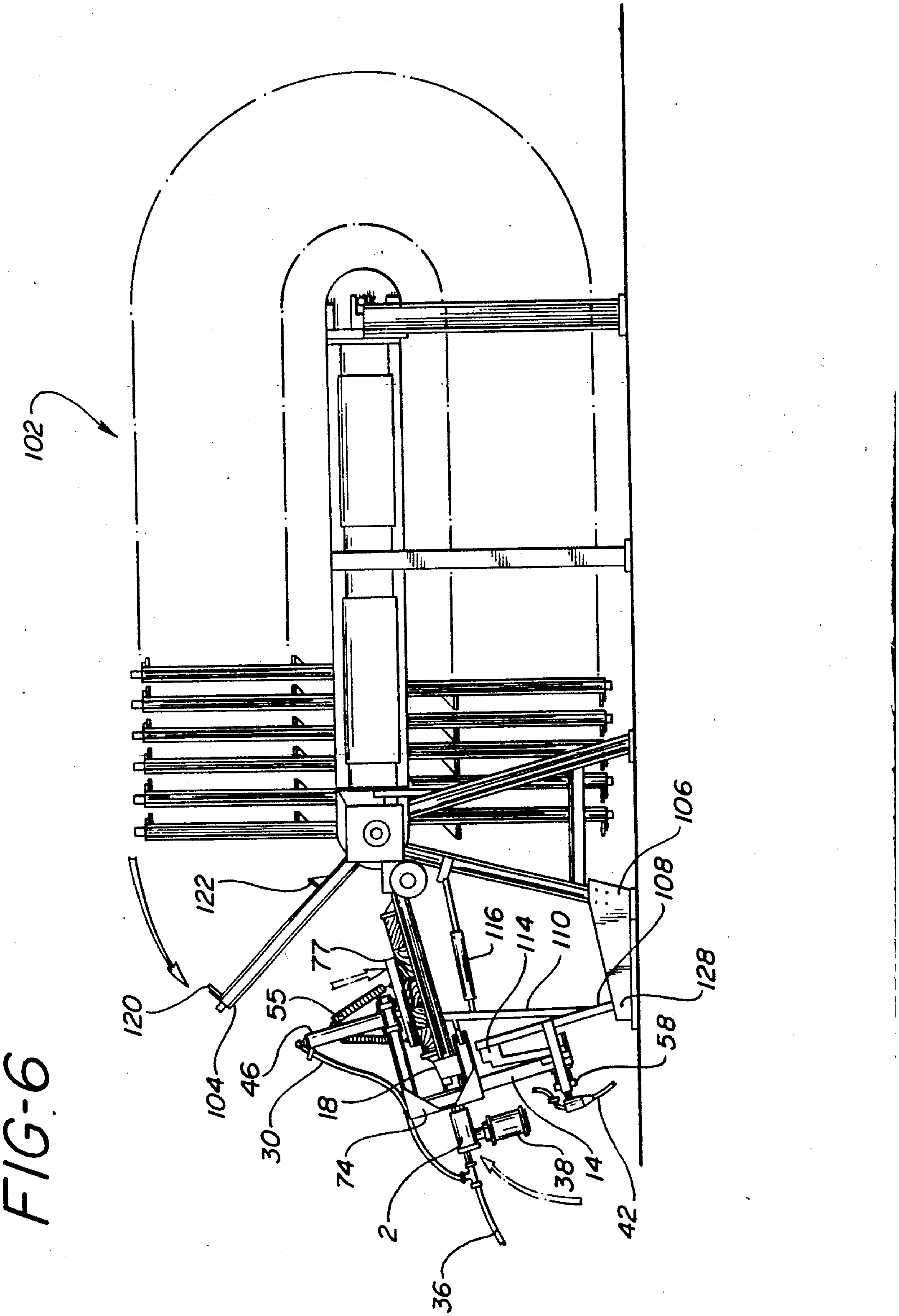
FIG. 6 is a diagrammatic view of the invention mounted for operation.

The entire operation of the device may be better understood in connection with FIG. 6, a diagrammatic view of the machine for supporting the wood pieces to be cured along with the mechanism of the present invention for tightening and loosening the clamps and for flattening the wood piece. More particularly, the machine is shown generally at reference numeral 102. The machine has a number of clamps 104 thereon each of which as stationary and movable jaws 120 and 122 respectively formed in sets. Jaw 122 is stationary whereas jaw 120 can be tightened or loosened. In FIG. 6, clamp 104 carrying jaws 120 and 122 is the next clamp to be brought into the working area.

The entire assembly which supports the automatic clamp tightener and the flattener must be indexed out of engagement with machine 102 if clamps 104 are to be capable of being brought into the working are. This is accomplished via base 106, air cylinder 116 and frame 110. These elements will permit the entire assembly to rotate out of the way of the clamps such as 104 to allow it to be brought into engagement with the work area. More particularly, base 106 has pivoted at pivot 128, the supporting rail 110. Air cylinder 116 allows rail 110 to pivot out of engagement with a clamp such as 104.

Note that elements 108, 110 and 114 are all one piece and bolted together.

A further pivot at 128 is accomplished at arm 108. This arm allows rail 114 to also pivot out of the way of clamp 104 on actuation of air cylinder 116, and 114 to which it is bolted.

The operations of the apparatus discussed in connection with FIGS. 4 and 5 can be modified so as to employ mechanical stops for end-left and end-right instead of the sensors 94 and 96 employed for that purpose. As shown in FIG. 4A, the structure employed is identical to that shown and described in FIG. 4 except that sensors 94 and 96 are eliminated. In this configuration, the chain shield guards **126*a* and 126*b* of FIG. 5 are employed as end-left and end-right mechanical stops for the lateral travel of the carriage 74. When the stops 126*a* and 126*b* are so employed, the motor 124 of FIG. 5 moves the carriage 74 to the stops 126*a* and 126*b*** at the end of its travel.

When sensors 94 and 96 are not utilized, motor 124 may be designed as a stepping motor or a servo motor. With a stepping motor, the carriage 74 will stop near each end of rail 114 after making a predetermined number of steps from the other end. With a servo motor, the carriage 74 will stop near each end of the rail 114 by matching predetermined control voltages indicative of the right and left ends of travel.

Another modification illustrated in FIGS. 7–10 relates to the clamp tightener. In these figures, the tightener is designed to tighten the clamp in several different modes (in addition to driving the tightener to stall as discussed in connection with FIG. 5). These modes include tightening the clamp for a predetermined period of time, or tightening the clamp until a predetermined torque or a predetermined strain is sensed in the clamp. With these later approaches, sensor 98 of FIG. 4 is eliminated (as shown in FIG. 4A).

Figure 8:
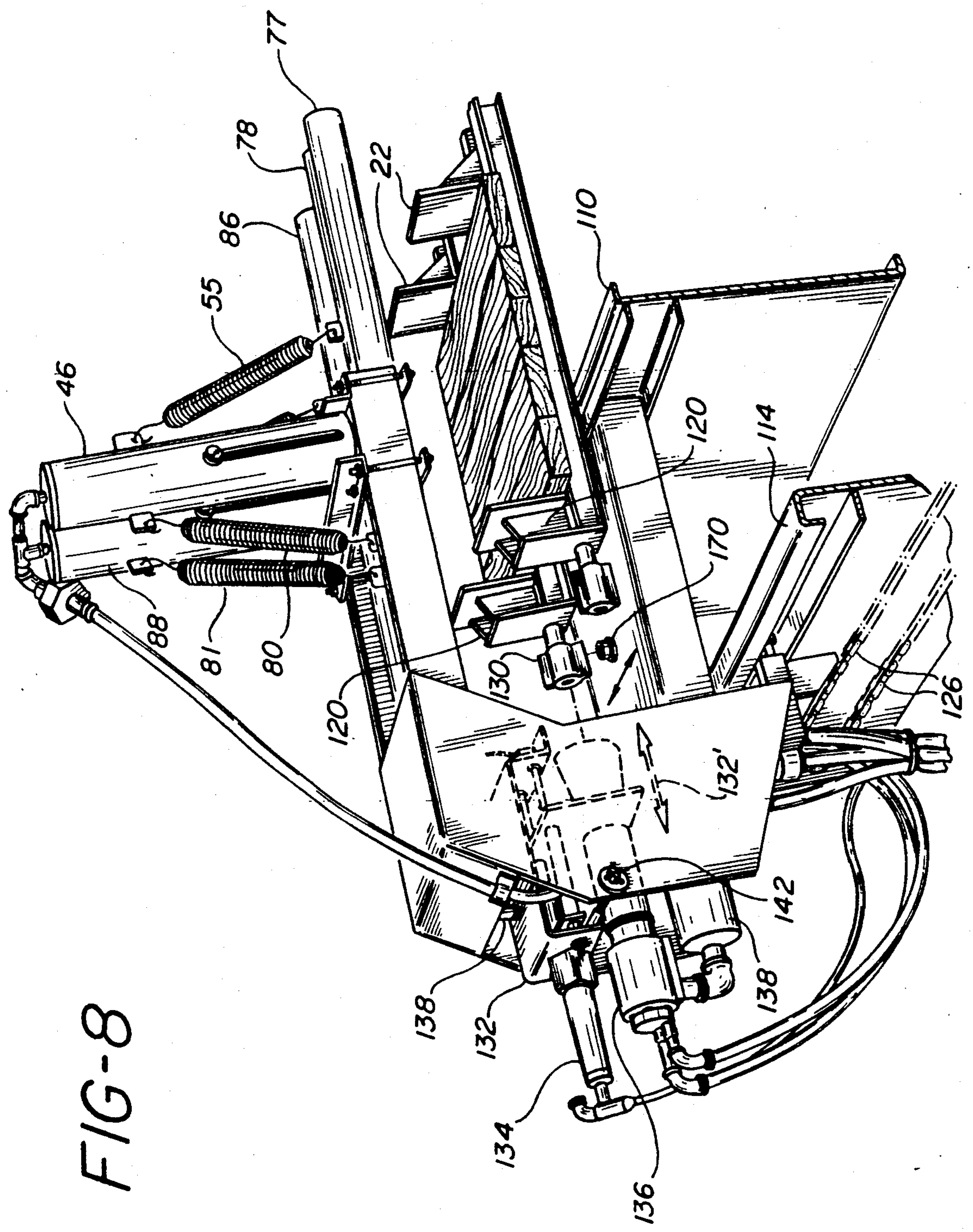
FIG. 8 is a perspective view of a modification of the devices shown in FIGS. 1, 4, 4A, and 5.

Referring now to FIG. 8 a modification of the apparatus of FIG. 5 is shown. This modification involves the elimination of the bladder 58 and associated parts so that the powered tightener 2 need not pivot into and out of engagement with the clamp to be adjusted. In FIGS. 5 and 8, like reference numerals have been used to designate like parts. Thus, in FIG. 8, the cylinders 46 and 88, springs 55 and 80–81, and hold-down bars 77–78 and 86 are identical to the corresponding elements described in connection with FIG. 5. The pieces of wood to be glued together are clamped between front jaws 120 and rear jaws 122 of clamps of the type shown in more detail in FIG. 7. In the same manner as described in connection with FIG. 5, supporting rails 110 and 114 mount the carriage 74.

The difference between FIG. 8 and FIG. 5 resides in the construction of the mounting of the air driven tightener. In FIG. 8, the tightener 136 is connected to muffler 138 and is slidably suspended from a support 132. As will be understood with reference to FIGS. 9 and 10, the tightener is moved into and out of engagement with the tightening nuts on the clamps under control of an air driven cylinder attached to support 132 which causes tightener 136 to move in the direction of the arrow 132' shown in FIG. 8.

Figure 9:
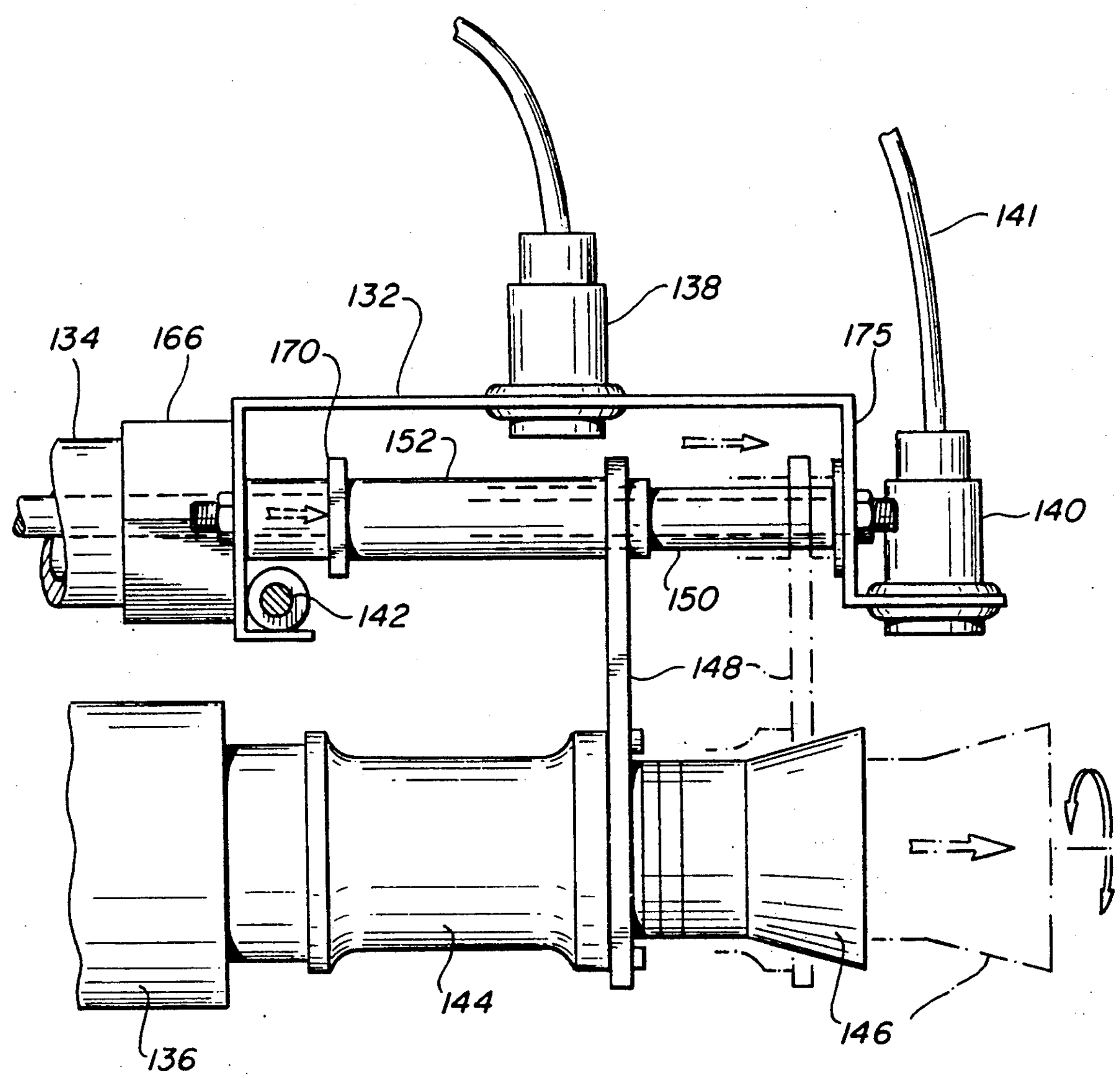
FIG. 9 is a side view of a portion of the modification shown in FIG. 8.
Figure 10:
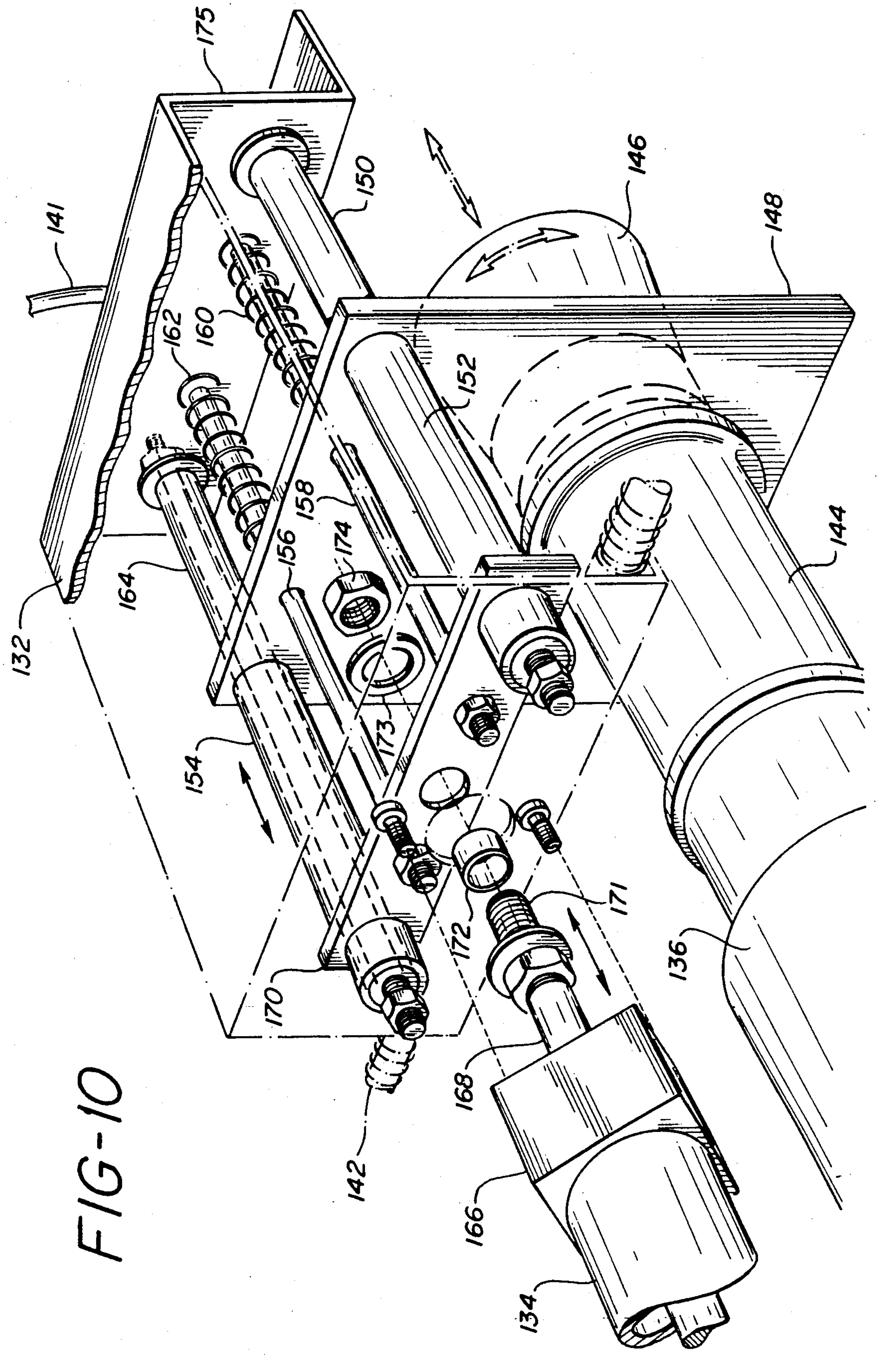
FIG. 10 is a perspective view of another portion of the modification shown in FIGS. 8-9.

The suspension system for the air driven tightener 136 is shown in detail in FIGS. 9–10. The system is mounted on support 132 and includes a vertically suspended plate 148. The plate 148 is slidably mounted on two rod assemblies, 154/164 and 152/150. These rod assemblies include smaller diameter cylinders 150 and 164 which interfit into larger diameter cylinders 152 and 154. Both sets of cylinders 154/164 and 152/150 are mounted on respective rods which are connected between the vertical walls of support 132. An air driven piston assembly 134 and 166 is connected to drive rod 168 horizontally. Rod 168 is connected to a bar 170 via connectors 171, 172, 173 and 174. Bar 170 is also connected to ride on cylinders 152 and 154. Lateral movement of shaft 168 thus causes plate 148 to move horizontally and thereby, cylinders 152 and 154 onto rods 150 and 164. This movement causes lateral movement of support plate 148 and thereby, lateral movement of rotating chuck 146.

The movement of the plate 148 is against the bias of compression springs 160 and 162. These springs are mounted on rods 158 and 156 which are connected between the bar 170 and the vertical rear wall 175 of support 132. Proximity sensors 138 and 140 are mounted on support 132 to detect the position of the tightener.

For strain sensing, FIG. 7 shows a clamp 104 (which is the same clamp 104 shown in FIG. 6), employing front jaw 120 and rear jaw 122. A tightening nut 130 is connected to the front of clamp 104. When the tightener engages the clamp 104 and starts to tighten the nut 130, a bellville washer 121, or other suitable collapsible member is gradually compressed as the nut 130 is tightened and the clamp increases its clamping force on the wood. A sensor is mounted on wrench mount towards the front jaw 120 and clamp 104 and stops the tightening and/or commences disengagement when the clamping force has reached a preset amount. The bellville washer 121 is mounted between the tightening nut of the clamp 104 and the front jaw 120 of clamp 104.

All of the sensors used in FIGS. 7–10 are the same proximity sensors used in FIG. 4.

The program for the controller of the invention operating in accordance with the embodiment of FIGS. 8–10 is set forth in Appendix A.

APPENDIX A

```
* NEW PROGRAM FORMAT : OPERATES ALMOST T
    HE SAME AS NPC7.21

DEFINE SENSETIGHTENBUTTON=1
DEFINE SENSELOOSENBUTTON=2
DEFINE SENSESTOPBUTTON=3
DEFINE SENSESAFETYEYE=4
DEFINE SENSECLAMP=5
DEFINE SENSELEFTSTOP=6
DEFINE SENSERIGHTSTOP=101
DEFINE SENSEWRENCHFORWARD=102
DEFINE SENSECAMSWITCH=103
DEFINE SENSEDRIVER=104
DEFINE SENSEREVERSECARRIERROTATEBUTTON=1
    05
DEFINE SENSEFORWARDCARRIERROTATEBUTTON=1
    06
DEFINE REVERSECARRIERROTATION=11
DEFINE FORWARDCARRIERROTATION=12
DEFINE WRENCHCCW=13
DEFINE WRENCHCW=14
DEFINE WRENCHFORWARD=15
DEFINE RUNLIGHT=16
DEFINE STOPLIGHT=111
DEFINE ADJUSTJAWLIGHT=112
DEFINE LEFTTRAVERSE=113
DEFINE RIGHTTRAVERSE=114
DEFINE EXTRAOUTPUT=115
DEFINE FLATTENERDOWN=116
DEFINE SAFETYBEAMISENABLED=860
DEFINE POWERRESTORED=868

HOLD 864 WHENEVER                                   864
                                           1    ---( )---

GOTO STOPMACHINE WHENEVER SENSESTOPBUTTO
    N OR POWERRESTORED OR (SENSESAFETYE
    YE AND SAFETYBEAMISENABLED)                  3        R         868       R
                                           2    ---| |------OR ------| |------OR ------(   --

730

HOLD FLATTENERDOWN WHENEVER WRENCHCW AND
    SAFETYBEAMISENABLED                          14       860       116
                                           3    ---| |------| |------( )---

TIGHTEN:
  * MOVE TO THE RIGHT, TIGHTENING EACH
    CLAMP UNLESS THE TIGHTEN BUTTON IS
  * HELD DOWN
  LATCH RUNLIGHT                                 701      16
                                           4    ---| |------(L)---
  LATCH SAFETYBEAMISENABLED                      701      860
                                           5    ---| |------(L)---
  UNLATCH ADJUSTJAWLIGHT                         701      112
                                           6    ---| |------(U)---
```

```
LATCH RIGHTTRAVERSE                             701       114
                                         7   ---| |------(L)---

RESET 927 TO 0   *** TRIES COUNTER **
  *                                             701       927
                                         8   ---| |-----(RST)--
                                                           0
TIMER 901 TO .3                                 701       901
                                         9   ---|/|-----(RST)--
                                                           0
                                                701       901
                                         10  ---| |-----(RTO)--
                                                           .3
GOTO NEXT IF 901 AND NOT SENSECLAMP             701       901        5          702
                                         11  ---| |------| |------|/|------(L)---
                                                702       701
                                         12  ---| |------(U)---
GOTO ROTATECARRIER IF SENSERIGHTSTOP            701       101        713
                                         13  ---| |------| |------(L)---
                                                713       701
                                         14  ---| |------(U)---

: * TRAVERSE UNTIL SENSE CLAMP.  SKIP
   CLAMP IF BUTTON IS HELD DOWN
GOTO NEXT IF SENSECLAMP AND NOT SENSE
  TIGHTENBUTTON                                 702       5          1          703
                                         15  ---| |------| |------|/|------(L)---
                                                703       702
                                         16  ---| |------(U)---
GOTO ROTATECARRIER IF SENSERIGHTSTOP            702       101        713
                                         17  ---| |------| |------(L)---
                                                713       702
                                         18  ---| |------(U)---

TIGHTENCLAMP:
  UNLATCH RIGHTTRAVERSE                         703       114
                                         19  ---| |------(U)---
  UNLATCH WRENCHCCW                             703       13
                                         20  ---| |------(U)---
  LATCH WRENCHCW                                703       14
                                         21  ---| |------(L)---
  LATCH WRENCHFORWARD                           703       15
                                         22  ---| |------(L)---
  RESET 904 TO 0                                703       904
                                         23  ---| |-----(RST)--
                                                           0
  RESET 908 TO 0                                703       908
                                         24  ---| |-----(RST)--
                                                           0
  TIMER 902 TO 1.5                              703       902
                                         25  ---|/|-----(RST)--
                                                           0
                                                703       902
                                         26  ---| |-----(RTO)--
                                                           1.5
  GOTO NEXT IF 902                              703       902        704
                                         27  ---| |------| |------(L)---
                                                704       703
                                         28  ---| |------(U)---

  GOTO CONTINUETIGHTENCLAMP IF SENSEWRE
    NCHFORWARD                                  703       102        705
                                         29  ---| |------| |------(L)---
                                                705       703
                                         30  ---| |------(U)---

  : * RELAX WRENCH, WAIT 1 SECOND AND T
    RY AGAIN
  UNLATCH WRENCHFORWARD                         704       15
                                         31  ---| |------(U)---
  UNLATCH WRENCHCW                              704       14
                                         32  ---| |------(U)---
  COUNT 927 TO 5                                704       927
                                         33  ---| |-----(CTU)--
                                                           5
  TIMER 903 TO 1.0                              704       903
                                         34  ---|/|-----(RST)--
                                                           0
                                                704       903
                                         35  ---| |-----(RTO)--
                                                           1.0
```

```
GOTO TIGHTENCLAMP IF 903
            704       903       703
    36  ---| |------| |------(L)---
            703       704
    37  ---| |------(U)---

GOTO STOPMACHINE IF 927
            704       927       730
    38  ---| |------| |------(L)---
            730       704
    39  ---| |------(U)---

CONTINUETIGHTENCLAMP: A FLIP FLOP BETWEE
     N STATES UNTIL DRIVER STALLS
  TIMER 905 TO .5
            705       905
    40  ---|/|-----(RST)--
                      0
            705       905
    41  ---| |-----(RTO)--
                      .5

  COUNT 904 TO 4
            705       904
    42  ---| |-----(CTU)--
                      4

  GOTO NEXT IF SENSEDRIVER
            705       104       706
    43  ---| |------| |------(L)---
            706       705
    44  ---| |------(U)---

  GOTO STALLED IF 905
            705       905       707
    45  ---| |------| |------(L)---
            707       705
    46  ---| |------(U)---

  GOTO SCREWPROTRUSION IF NOT SENSEWREN
    CHFORWARD AND 904
            705       102       904       708
    47  ---| |------|/|------| |------(L)---
            708       705
    48  ---| |------(U)---

  :
  TIMER 906 TO .5
            706       906
    49  ---|/|-----(RST)--
                      0
            706       906
    50  ---| |-----(RTO)--
                      .5

  GOTO CONTINUETIGHTENCLAMP IF NOT SENS
    EDRIVER
            706       104       705
    51  ---| |------|/|------(L)---
            705       706
    52  ---| |------(U)---

  GOTO NEXT IF 906
            706       906       707
    53  ---| |------| |------(L)---
            707       706
    54  ---| |------(U)---

STALLED:
  UNLATCH WRENCHCW
            707       14
    55  ---| |------(U)---
  UNLATCH WRENCHFORWARD
            707       15
    56  ---| |------(U)---
  TIMER 907 TO .3 IF NOT SENSEWRENCHFOR
    WARD
            707       907
    57  ---|/|-----(RST)--
                      0
            707       102       907
    58  ---| |------|/|-----(RTO)--
                                .3

  GOTO TIGHTEN IF 907
            707       907       701
    59  ---| |------| |------(L)---
            701       707
    60  ---| |------(U)---

SCREWPROTRUSION:
  UNLATCH WRENCHCW
            708       14
    61  ---| |------(U)---
  LATCH WRENCHCCW
            708       13
    62  ---| |------(L)---
  UNLATCH RUNLIGHT
            708       16
    63  ---| |------(U)---
  LATCH ADJUSTJAWLIGHT
            708       112
    64  ---| |------(L)---
  GOTO NEXT IF SENSEWRENCHFORWARD
            708       102       709
    65  ---| |------| |------(L)---
            709       708
    66  ---| |------(U)---
```

```
:
COUNT 908 TO 22 IF SENSEDRIVER
                                              709        104        908
                                      67   ---| |------| |-----(CTU)--
                                                                    22
GOTO NEXT IF 908
                                              709        908        710
                                      68   ---| |------| |------(L)---
                                              710        709
                                      69   ---| |------(U)---

GOTO TIGHTENCLAMP IF NOT SENSEWRENCHE
  ORWARD
                                              709        102        703
                                      70   ---| |------|/|------(L)---
                                              703        709
                                      71   ---| |------(U)---

PROTRUSION2:
  UNLATCH SAFETYBEAMISENABLED
                                              710        860
                                      72   ---| |------(U)---
  UNLATCH WRENCHFORWARD
                                              710        15
                                      73   ---| |------(U)---
  UNLATCH WRENCHCCW
                                              710        13
                                      74   ---| |------(U)---
  TIMER 909 TO .3 IF NOT SENSEWRENCHFOR
    WARD
                                              710        909
                                      75   ---|/|-----(RST)--
                                                         0
                                              710        102        909
                                      76   ---| |------|/|-----(RTO)--
                                                                    .3
  GOTO NEXT IF 909
                                              710        909        711
                                      77   ---| |------| |------(L)---
                                              711        710
                                      78   ---| |------(U)---

  : * GET PASSED CLAMP
  LATCH LEFTTRAVERSE
                                              711        113
                                      79   ---| |------(L)---
  TIMER 910 TO .5
                                              711        910
                                      80   ---|/|-----(RST)--
                                                         0
                                              711        910
                                      81   ---| |-----(RTO)--
                                                         .5
  GOTO NEXT IF 910 AND (SENSELEFTSTOP O
    R SENSECLAMP)
                                              711        910                        6          R
                                      82   ---| |------| |------(    ------| |------OR ---
                                              712        711
                                      83   ---| |------(U)---

  : * WAIT FOR START BUTTON
  UNLATCH LEFTTRAVERSE
                                              712        113
                                      84   ---| |------(U)---
  GOTO TIGHTEN IF SENSETIGHTENBUTTON
                                              712        1          701
                                      85   ---| |------| |------(L)---
                                              701        712
                                      86   ---| |------(U)---

ROTATECARRIER:
  UNLATCH RIGHTTRAVERSE
                                              713        114
                                      87   ---| |------(U)---
  LATCH REVERSECARRIERROTATION
                                              713        11
                                      88   ---| |------(L)---
  TIMER 911 TO .3
                                              713        911
                                      89   ---|/|-----(RST)--
                                                         0
                                              713        911
                                      90   ---| |-----(RTO)--
                                                         .3
  GOTO NEXT IF 911
                                              713        911        714
                                      91   ---| |------| |------(L)---
                                              714        713
                                      92   ---| |------(U)---

  : * WAIT FOR FRONT REST TO COME OUT
  UNLATCH REVERSECARRIERROTATION
                                              714        11
                                      93   ---| |------(U)---
  TIMER 912 TO 2.2
                                              714        912
                                      94   ---|/|-----(RST)--
                                                         0
                                              714        912
```

```
                                                95   ---| |-----(RTO)--
                                                                2.2
                                                      714       912       715
GOTO NEXT IF 912                                96   ---| |------| |------(L)---
                                                      715       714
                                                97   ---| |------(U)---

: * ROTATE FORWARD 1 SECOND BEFORE SE
  NSING FOR CAM
LATCH FORWARDCARRIERROTATION                          715       12
                                                98   ---| |------(L)---
TIMER 913 TO 1.0                                      715       913
                                                99   ---|/|-----(RST)--
                                                                0
                                                      715       913
                                                100  ---| |-----(RTO)--
                                                                1.0
GOTO NEXT IF 913 AND SENSECAMSWITCH                   715       913       103       716
                                                101  ---| |------| |------| |------(L)---
                                                      716       715
                                                102  ---| |------(U)---

PULSE: * PULSE AIR MOTOR DRIVE UNTIL CAM
     SWITCH TURNS OFF
  UNLATCH FORWARDCARRIERROTATION                      716       12
                                                103  ---| |------(U)---
  TIMER 914 TO .2                                     716       914
                                                104  ---|/|-----(RST)--
                                                                0
                                                      716       914
                                                105  ---| |-----(RTO)--
                                                                .2
  GOTO NEXT IF 914                                    716       914       717
                                                106  ---| |------| |------(L)---
                                                      717       716
                                                107  ---| |------(U)---
  GOTO LOOSEN IF NOT SENSECAMSWITCH                   716       103       718
                                                108  ---| |------|/|------(L)---
                                                      718       716
                                                109  ---| |------(U)---

  :
  LATCH FORWARDCARRIERROTATION                        717       12
                                                110  ---| |------(L)---
  TIMER 915 TO .1                                     717       915
                                                111  ---|/|-----(RST)--
                                                                0
                                                      717       915
                                                112  ---| |-----(RTO)--
                                                                .1
  GOTO NEXT IF NOT SENSECAMSWITCH                     717       103       718
                                                113  ---| |------|/|------(L)---
                                                      718       717
                                                114  ---| |------(U)---
  GOTO PULSE IF 915                                   717       915       716
                                                115  ---| |------| |------(L)---
                                                      716       717
                                                116  ---| |------(U)---

LOOSEN:
  UNLATCH FORWARDCARRIERROTATION                      718       12
                                                117  ---| |------(U)---
  UNLATCH SAFETYBEAMISENABLED                         718       860
                                                118  ---| |------(U)---
  LATCH RUNLIGHT                                      718       16
                                                119  ---| |------(L)---
  LATCH LEFTTRAVERSE                                  718       113
                                                120  ---| |------(L)---
  RESET 928 TO 0                                      718       928
                                                121  ---| |-----(RST)--
                                                                0
  TIMER 916 TO .3                                     718       916
                                                122  ---|/|-----(RST)--
                                                                0
                                                      718       916
                                                123  ---| |-----(RTO)--
                                                                .3
  GOTO NEXT IF 916 AND NOT SENSECLAMP                 718       916       5         719
                                                124  ---| |------| |------|/|------(L)---
```

```
                                            719      718
                                       125  ---| |------(U)---
GOTO WAITFORBEAM IF SENSELEFTSTOP           718      6          729
                                       126  ---| |------| |------(L)---
                                            729      718
                                       127  ---| |------(U)---

:
GOTO NEXT IF SENSECLAMP AND NOT SENSE
  LOOSENBUTTON
                                            719      5          2          720
                                       128  ---| |------| |------|/|------(L)---
                                            720      719
                                       129  ---| |------(U)---
GOTO WAITFORBEAM IF SENSELEFTSTOP           719      6          729
                                       130  ---| |------| |------(L)---
                                            729      719
                                       131  ---| |------(U)---

LOOSENCLAMP:
  RESET 919 TO 0                            720      919
                                       132  ---| |-----(RST)--
                                                     0
  UNLATCH LEFTTRAVERSE                      720      113
                                       133  ---| |------(U)---
  LATCH WRENCHCCW                           720      13
                                       134  ---| |------(L)---
  LATCH WRENCHFORWARD                       720      15
                                       135  ---| |------(L)---
  UNLATCH WRENCHCW                          720      14
                                       136  ---| |------(U)---
  TIMER 917 TO 1.5                          720      917
                                       137  ---|/|-----(RST)--
                                                     0
                                            720      917
                                       138  ---| |-----(RTO)--
                                                     1.5
  GOTO NEXT IF 917                          720      917        721
                                       139  ---| |------| |------(L)---
                                            721      720
                                       140  ---| |------(U)---

  GOTO CONTINUELOOSENCLAMP IF SENSEWREN
    CHFORWARD
                                            720      102        722
                                       141  ---| |------| |------(L)---
                                            722      720
                                       142  ---| |------(U)---

  : * RELAX WRENCH FOR 1 SECOND AND TRY
     AGAIN
  UNLATCH WRENCHFORWARD                     721      15
                                       143  ---| |------(U)---
  UNLATCH WRENCHCCW                         721      13
                                       144  ---| |------(U)---
  COUNT 928 TO 5                            721      928
                                       145  ---| |-----(CTU)--
                                                     5
  TIMER 918 TO 1.0                          721      918
                                       146  ---|/|-----(RST)--
                                                     0
                                            721      918
                                       147  ---| |-----(RTO)--
                                                     1.0
  GOTO LOOSENCLAMP IF 918                   721      918        720
                                       148  ---| |------| |------(L)---
                                            720      721
                                       149  ---| |------(U)---
  GOTO STOPMACHINE IF 928                   721      928        730
                                       150  ---| |------| |------(L)---
                                            730      721
                                       151  ---| |------(U)---

CONTINUELOOSENCLAMP:
  RESET 922 TO 0                            722      922
                                       152  ---| |-----(RST)--
                                                     0
  RESET 920 TO 0                            722      920
                                       153  ---| |-----(RST)--
                                                     0
  COUNT 919 TO 4 IF SENSEDRIVER             722      104        919
                                       154  ---| |------| |-----(CTU)--
                                                                4
```

```
GOTO STAMPINGSENSED IF SENSECLAMP                 722       5          724
                                              155 ---| |------| |------(L)---
                                                  724       722
                                              156 ---| |------(U)---

GOTO NUTBACKOFF IF NOT SENSEWRENCHFOR
  WARD                                            722       102        726
                                              157 ---| |------|/|------(L)---
                                                  726       722
                                              158 ---| |------(U)---
GOTO DONELOOSENING IF 919                         722       919        728
                                              159 ---| |------| |------(L)---
                                                  728       722
                                              160 ---| |------(U)---

: * LEAVE THIS STATE BLANK

STAMPINGSENSED: * LOOSEN UNTIL NOT SENSE
    D, THEN 10 TURNS
  COUNT 920 TO 10 IF NOT SENSECLAMP               724       5          920
                                              161 ---| |------|/|-----(CTU)--
                                                                       10
  GOTO DONELOOSENING IF 920                       724       920        728
                                              162 ---| |------| |------(L)---
                                                  728       724
                                              163 ---| |------(U)---

  GOTO NUTBACKOFF IF NOT SENSEWRENCHFOR
    WARD                                          724       102        726
                                              164 ---| |------|/|------(L)---
                                                  726       724
                                              165 ---| |------(U)---
  GOTO NEXT IF NOT SENSEDRIVER                    724       104        725
                                              166 ---| |------|/|------(L)---
                                                  725       724
                                              167 ---| |------(U)---

:
GOTO STAMPINGSENSED IF SENSEDRIVER                725       104        724
                                              168 ---| |------| |------(L)---
                                                  724       725
                                              169 ---| |------(U)---

NUTBACKOFF: * TIGHTEN UNTIL WRENCH FORWA
    RD THEN 4 TURNS OR WRENCH STALLS
  UNLATCH WRENCHCCW                               726       13
                                              170 ---| |------(U)---
  LATCH WRENCHCW                                  726       14
                                              171 ---| |------(L)---
  TIMER 921 TO .4                                 726       921
                                              172 ---|/|-----(RST)--
                                                            0
                                                  726       921
                                              173 ---| |-----(RTO)--
                                                            .4
  COUNT 922 TO 3 IF SENSEWRENCHFORWARD            726       102        922
                                              174 ---| |------| |-----(CTU)--
                                                                       3
  GOTO LOOSENCLAMP IF 921                         726       921        720
                                              175 ---| |------| |------(L)---
                                                  720       726
                                              176 ---| |------(U)---
  GOTO DONELOOSENING IF 922                       726       922        728
                                              177 ---| |------| |------(L)---
                                                  728       726
                                              178 ---| |------(U)---
  GOTO NEXT IF NOT SENSEDRIVER                    726       104        727
                                              179 ---| |------|/|------(L)---
                                                  727       726
                                              180 ---| |------(U)---

:
TIMER 923 TO .4                                   727       923
                                              181 ---|/|-----(RST)--
                                                            0
                                                  727       923
                                              182 ---| |-----(RTO)--
                                                            .4
GOTO LOOSENCLAMP IF 923                           727       923        720
                                              183 ---| |------| |------(L)---
                                                  720       727
```

```
                                              184  ---| |------(U)---
   GOTO NUTBACKOFF IF SENSEDRIVER                       727       104       726
                                              185  ---| |------| |------(L)---
                                                        726       727
                                              186  ---| |------(U)---

DONELOOSENING: * WAIT TILL WRENCH FALLS

                                                                              27

     BACK THEN .3 SECONDS
   UNLATCH WRENCHCW                                 728       14
                                          187  ---| |------(U)---
   UNLATCH WRENCHCCW                                728       13
                                          188  ---| |------(U)---
   UNLATCH WRENCHFORWARD                            728       15
                                          189  ---| |------(U)---
   TIMER 924 TO .3 IF NOT SENSEWRENCHFOR
     WARD                                           728       924
                                          190  ---|/|------(RST)--
                                                              0
                                                    728       102       924
                                          191  ---| |------|/|------(RTO)--
                                                                        .3
   GOTO LOOSEN CLAMP IF 924                         728       924       718
                                          192  ---| |------| |------(L)---
                                                    718       728
                                          193  ---| |------(U)---

WAITFORBEAM:
   UNLATCH LEFTTRAVERSE                             729       113
                                          194  ---| |------(U)---
   GOTO NEXT IF SENSESAFETYEYE                      729       4         730
                                          195  ---| |------| |------(L)---
                                                    730       729
                                          196  ---| |------(U)---

STOPMACHINE:
   RESETALL
                                                    730       11
                                          197  ---| |------(U)---
                                                    730       12
                                          198  ---| |------(U)---
                                                    730       13
                                          199  ---| |------(U)---
                                                    730       14
                                          200  ---| |------(U)---
                                                    730       15
                                          201  ---| |------(U)---
                                                    730       16
                                          202  ---| |------(U)---
                                                    730       112
                                          203  ---| |------(U)---
                                                    730       113
                                          204  ---| |------(U)---
                                                    730       114
                                          205  ---| |------(U)---
                                                    730       701
                                          206  ---| |------(U)---
                                                    730       702
                                          207  ---| |------(U)---
                                                    730       703
                                          208  ---| |------(U)---
                                                    730       704
                                          209  ---| |------(U)---
                                                    730       705
                                          210  ---| |------(U)---
                                                    730       706
                                          211  ---| |------(U)---
                                                    730       707
```

```
212  ---| |------(U)---
        730      708
213  ---| |------(U)---
        730      709
214  ---| |------(U)---
        730      710
215  ---| |------(U)---
        730      711
216  ---| |------(U)---
        730      712
217  ---| |------(U)---
        730      713
218  ---| |------(U)---
        730      714
219  ---| |------(U)---
        730      715
220  ---| |------(U)---
        730      716
221  ---| |------(U)---
        730      717
222  ---| |------(U)---
        730      718
223  ---| |------(U)---
        730      719
224  ---| |------(U)---
        730      720
225  ---| |------(U)---
        730      721
226  ---| |------(U)---
        730      722
227  ---| |------(U)---
        730      724
228  ---| |------(U)---
        730      725
229  ---| |------(U)---
        730      726
230  ---| |------(U)---
        730      727
231  ---| |------(U)---
        730      728
232  ---| |------(U)---
        730      729
233  ---| |------(U)---
        730      860
234  ---| |------(U)---

HOLD STOPLIGHT
        730      111
235  ---| |------( )---
        730      1            701
236  ---| |------| |------(L)---
        701      730
GOTO TIGHTEN IF SENSETIGHTENBUTTON
237  ---| |------(U)---
        730      2            718
238  ---| |------| |------(L)---
        718      730
GOTO LOOSEN IF SENSELOOSENBUTTON
239  ---| |------(U)---

GOTO FCR IF SENSEFORWARDCARRIERROTATE
  BUTTON
        730      106          732
240  ---| |------| |------(L)---
        732      730
```

```
                                              241  ---| |------(U)---
GOTO NEXT IF SENSEREVERSECARRIERROTAT
  EBUTTON                                          730        105        731
                                              242  ---| |------| |------(L)---
                                                   731        730
                                              243  ---| |------(U)---

: * ROTATE CARRIER IN REVERSE
TIMER 925 TO .3                                    731        925
                                              244  ---|/|-----(RST)--
                                                               0
                                                   731        925
                                              245  ---| |-----(RTO)--
                                                              .3
TIMER 926 TO 2.5                                   731        926
                                              246  ---|/|-----(RST)--
                                                               0
                                                   731        926
                                              247  ---| |-----(RTO)--
                                                              2.5

LATCH REVERSECARRIERROTATION IF NOT 9
  25 OR 926                                        731        925        R          926        11
                                              248  ---| |------|/|------OR ------| |------(L)---

UNLATCH REVERSECARRIERROTATION IF 925
   AND NOT 926                                     731        925        926        11
                                              249  ---| |------| |------|/|------(U)---

GOTO STOPMACHINE IF NOT SENSEREVERSEC
  ARRIERROTATEBUTTON                               731        105        730
                                              250  ---| |------|/|------(L)---
                                                   730        731
                                              251  ---| |------(U)---

FCR: * ROTATE CARRIER FORWARD
LATCH FORWARDCARRIERROTATION                       732        12
                                              252  ---| |------(L)---

GOTO STOPMACHINE IF NOT SENSEFORWARDC
  ARRIERROTATEBUTTON                               732        106        730
                                              253  ---| |------|/|------(L)---
                                                   730        732
                                              254  ---| |------(U)---
```

While several embodiments of the invention have been illustrated and described, it is apparent that many other variations may be made in the particular design and configurations shown herein without departing from the scope of the invention set forth in the appended claims.

What is claimed is:

1. In a device for allowing glued pieces of wood to dry, said device incorporating clamps to hold the pieces of wood in close and high pressure engagement, the improvement comprising:

means for automatically tightening and loosening said clamps including fluid driven rotating means mounted for engagement with said clamp;

means connected to said tightening means for automatically flattening and securely holding the wood when said clamp are being tightened including a hold-down means actuated momentarily before said tightener means to:

(i) flatten the work piece before said clamp is tightened and (ii) to hold down and align the work piece at the location to be tightened; and a sensor of a proximity type for generating electrical signals on the sensing of the location of a clamp to be tightened and means in said clamp for generating an electrical signal indicative of the force exerted on said clamp by said tightener.

2. The device of claim 1 further including a programmable controller connected to said sensors, said controller being programed to actuate said tightener and said hold-downs on the occurrence of the various events and generation of electrical signals corresponding thereto as sensed by said sensor and said signal generating means.

3. A machine for clamping a plurality of glued pieces of wood, the improvement comprising:

an automated clamp tightener and flattener assembly, said assembly comprising:

a base;

a frame attached to said base;

a tightener attached to said frame moveable between a first position and a second position:

flattener means attached to said frame for flattening wood pieces at two adjacent work stations; and means to sense the location of said assembly including automatic proximity sensors mounted on said assembly for developing electrical signals indicative of the location of a clamp to be tightened and the location of said tightener in said first or second positions.

4. The machine of claim 3 wherein said electrical signals are connected to a programed controller, programed to move said tightener between said first and second positions and to implement a control sequence with the output of said sensors.

* * * * *